(12) United States Patent
Volotinen et al.

(10) Patent No.: US 8,917,281 B2
(45) Date of Patent: Dec. 23, 2014

(54) IMAGE RENDERING METHOD AND SYSTEM

(71) Applicant: Rightware Oy, Espoo (FI)

(72) Inventors: Tuomas Volotinen, Espoo (FI); Denis Kudinkin, Espoo (FI)

(73) Assignee: Rightware Oy, Espoo (FI)

( * ) Notice: Subject to any disclaimer, the term of this patent is extended or adjusted under 35 U.S.C. 154(b) by 122 days.

(21) Appl. No.: 13/668,344

(22) Filed: Nov. 5, 2012

(65) Prior Publication Data

US 2014/0125686 A1    May 8, 2014

(51) Int. Cl.
*G09G 5/02* (2006.01)
*G09G 5/00* (2006.01)

(52) U.S. Cl.
USPC ............................... 345/589; 345/581

(58) Field of Classification Search
CPC .......... G06T 1/00–1/0092; G06T 1/60; G06T 15/00–15/005; G09G 5/36–5/366; G09G 5/39; G09G 5/00–5/008; G09G 5/02–5/028; G06F 13/00; G06F 17/00–17/608
USPC ......... 345/418, 419, 530, 531, 536, 545, 581, 345/589
See application file for complete search history.

(56) References Cited

U.S. PATENT DOCUMENTS

| | | | |
|---|---|---|---|
| 6,891,533 B1 * | 5/2005 | Alcorn et al. | 345/419 |
| 2006/0109266 A1 * | 5/2006 | Itkowitz et al. | 345/419 |
| 2011/0074800 A1 * | 3/2011 | Stevens et al. | 345/545 |
| 2011/0267363 A1 * | 11/2011 | Miller et al. | 345/592 |
| 2012/0147020 A1 * | 6/2012 | Hussain et al. | 345/522 |

* cited by examiner

*Primary Examiner* — Jacinta M Crawford
(74) *Attorney, Agent, or Firm* — Seppo Laine Oy; Joshua P. Wert (57) ABSTRACT

An image rendering method is provided, comprising comparing a current image frame with a previous image frame to detect a dynamic change in an object in the image frames, with each image frame being defined by a scene graph and each object having an associated geometric bounding volume. If a dynamic change in an object is detected, the method comprises rendering the object's geometric bounding volume to a stencil buffer for each dynamically changed object, using a stencil value assigned to the current image frame. A stencil is then applied to determine areas in the frames having non-zero stencil values. The method further comprises clearing a color buffer with respect to the areas in the previous image frame that have been redrawn and with respect to areas in the current frame that need to be overdrawn, rendering the image frame to the color buffer using a stencil test, so that only the areas with non-zero stencil values are redrawn, and then removing the stencil values from a previous image frame from the stencil buffer.

20 Claims, 6 Drawing Sheets

IMAGE RENDERING METHOD AND SYSTEM

FIELD OF THE INVENTION

This invention relates to an image rendering method and system, and in particular to a method of and system for processing only those fragments of an image frame that have changed when compared to a previous image frame.

BACKGROUND TO THE INVENTION

The processing and rendering of graphics images is an important feature of modern computing systems. In image processing, mathematical procedures are implemented to render, or draw, graphic primitives, e.g., triangles or rectangles, on a display to produce desired visual images. Real time graphics processing is based on the high-speed processing of graphic primitives to produce visually pleasing moving images.

To enhance image quality, shadow generation techniques such as stenciled shadow volumes have been introduced to add realistic shadows to rendered images. The stenciled shadow volume technique depends on the use of a stencil buffer, described in more detail further below.

Graphics are typically designed by graphics designers who use application program interfaces (APIs), which are standardized software interfaces, to render desired images that can be run on multiple platforms, operating systems, and hardware. Examples of APIs include the Open Graphics Library (OpenGL®) and D3D™. This enables graphic designers to design graphics without knowing any of the specifics regarding the system hardware or how their commands will be implemented. Application program interfaces (APIs) are widely accepted, powerful, and are good vehicles for implementing features such as those of the present invention.

When a graphics image is rendered each pixel of that image is given a set of values that are stored in a buffer memory and that are used to "display" the pixel. For example, each pixel can have a color value that is stored in a color buffer and a depth value that is stored in a depth (Z) buffer memory.

In addition to color and depth buffer memories, each pixel can also have an entry in a stencil buffer. A stencil buffer is a memory comprised of stencil registers that can control the update of a pixel. In the simplest case, the stencil buffer is used to limit the area of rendering (stenciling). In particular, the stencil buffer enables or disables drawing to the rendering target surface on a pixel-by-pixel basis. At its most fundamental level, it enables applications to mask sections of the rendered image so that they are not displayed.

Typical uses of stencil buffers include defining regions for masking pixel updates, constructive solid geometry, and adding shadows. For example, if portions of a "background" are to show through windows, the stencil registers for the background that will show can be given values while the stencil registers for other areas can be cleared. The value of the stencil registers can then be compared to a threshold value and used to mask-out areas that are not to show through (or mask-in the areas that are). More advanced usage of the stencil buffer makes use of the strong connection between the depth buffer and the stencil buffer in the rendering pipeline. For example, stencil values can be automatically increased/decreased for every pixel that fails or passes the depth test. Related to stencil buffers is a stencil test, which conditionally discards a fragment based on the outcome of a comparison between the value in the stencil buffer at a particular location and a reference value.

As previously noted a stencil buffer can also be used to add shadows. Shadows can enhance an image by producing a more natural-looking image. Since graphic shadows correspond to real world shadows, graphic shadows represent the effects of shading caused by surfaces that block light. Since a given image may have both multiple light sources and multiple light-blocking surfaces the shadow value of each pixel depends on the shading produced by all of the light sources and all of the light-blocking surfaces. Images with convincing shadows can be produced using one or more shadow algorithms that store values in a stencil buffer. Most shadow algorithms "turn off" the light sources, determine a base shadow value for each pixel, then selectively turn on the individual light sources, determine the shadow value produced by each light source, and then blend the result to produce a composite shadow value for each pixel. On embedded graphics hardware with OpenGL ES 2.0 standard, for example, the processing of shadows is often the slowest component, even with simple fragment shaders.

Thus, in order to render an image, all fragments (OR PIXELS?) of the image need to be processed. However, in consecutive image frames in which only a portion of the fragments in the image frames are changing and which require instant visual feedback, such as automotive cluster instrument digital speedometer rendering, all the fragments in the image frames, up until now, needed to be processed.

The foregoing overview has been presented in a simplified manner for clarity. Implementing the foregoing is often performed using graphics design packages. Such packages enable a graphics designer to specify numerous editing and formatting attributes, including shadow algorithms and other uses of the stencil buffer.

When using a stencil buffer, such as when implementing a shadow algorithm, it is typically necessary to first clear the stencil registers. For example, when determining the effects of light sources on the stencil value of each pixel it is typically necessary to clear the stencil buffer multiple times, e.g., once for each light source. By clearing it is meant setting the value of cleared stencil registers to some predetermined value, often, but not always, 00hex. While clearing a stencil register is not particularly difficult, say by writing a predetermined value to each stencil register, writing that value to each stencil register is a fairly slow process given that millions of stencil registers might exist. Having to do so multiple times, such as when shadow rendering, can become excessively time consuming. Additionally, stencil-only frame buffer clears are increasingly common as 3D applications are now using rendering algorithms such as stenciled shadow volume rendering for multiple light sources in a single frame, recent "soft" stenciled shadow volume techniques, and stencil-based constructive solid geometry techniques. In such algorithms there are multiple stencil buffer clears for each depth buffer clear.

In view of the foregoing, a method of effectively clearing stencil registers at high speed would be beneficial. Also beneficial would be methods of enabling a graphics designer to control the clearing of stencil registers such that the use of the stencil buffer is not negatively impacted. Also beneficial would be a high speed system and method for effectively clearing stencil registers such that numerical algorithms that use the stencil buffer are not negatively impacted.

The aim of the present invention is thus to reduce GPU fragment processing for consecutive image frames, with each image frame being defined by a scene graph and with each object within each image frame having an associated geometric bounding volume. In particular, in real-time applications, wherein only relatively minor parts or objects of an image frame change, when compared to a previous image frame, the performance is increased if only those minor parts are re-rendered.

A scene graph is a general data structure commonly used by graphics editing applications and modern computer games. The scene graph is a structure that arranges the logical and often (but not necessarily) spatial representation of a graphics image. A scene graph is a collection of nodes in a graph or tree structure. A node may have many children but often only a single parent, with the effect of a parent applied to all its child nodes; an operation performed on a group automatically propagates its effect to all of its members. In many programs, associating a geometrical transformation matrix at each group level and concatenating such matrices together is an efficient and natural way to process such operations. A common feature, for instance, is the ability to group related shapes/objects into a compound object that can then be moved, transformed, selected, etc. as easily as a single object.

SUMMARY OF THE INVENTION

According to a first aspect of the invention there is provided an image rendering method comprising:
  comparing a current image frame with a previous image frame to detect a dynamic change in an object in the image frames, with each image frame being defined by a scene graph and each object having an associated geometric bounding volume;
  if a dynamic change in an object is detected, rendering the object's geometric bounding volume to a stencil buffer for each dynamically changed object, using a stencil value assigned to the current image frame;
  applying a stencil test to determine areas in the frames having non-zero stencil values;
  clearing a color buffer with respect to the areas in the previous image frame that have been redrawn and with respect to areas in the current frame that need to be overdrawn;
  rendering the image frame to the color buffer using a stencil test, so that only the areas with non-zero stencil values are redrawn; and
  removing the stencil values from a previous image frame from the stencil buffer.

In an embodiment, each object in a scene graph has an associated transformation matrix, with the step of detecting a dynamic change in an object comprising detecting whether an object's transformation matrix has changed.

In an embodiment, and in the case of single buffer rendering, the step of removing the stencil values from a previous image frame from the stencil buffer comprises removing the stencil values from the preceding image frame.

In this embodiment, every even image frame in the stencil buffer is assigned a stencil value of 1 and every odd image frame is assigned a stencil value of 2.

In particular, the step of removing the stencil values from the previous image frame from the stencil buffer comprises replacing every even image frame in the stencil buffer with a value of 2 with a 0, and replacing every odd image frame in the stencil buffer with a value of 1 with a 0.

In an alternate embodiment, and in the case of double buffer rendering, the step of removing the stencil values from a previous image frame from the stencil buffer comprises the step of removing the stencil values for the frame rendered two frames before.

In this embodiment, the method comprises assigning a stencil value of 1 for the first frame, a stencil value of 2 for the second frame, a stencil value of 3 for the third frame, and then repeating this for subsequent frames.

In particular, the method comprises providing two color buffers, namely a front color buffer and a back color buffer, with the front color buffer being exposed to a user and the back color buffer being used to render the image in the background.

In an embodiment, the method comprises swapping the color buffers once the rendering in the back color buffer has been completed, so that the back color buffer then becomes the front color buffer and the front color buffer becomes the back color buffer to allow rendering of the next image frame to take place in the back color buffer.

In an embodiment, the objects are either opaque or translucent.

According to a second aspect of the invention there is provided an image rendering system comprising a processor to:
  compare a current image frame with a previous image frame to detect a dynamic change in an object in the image frames, with each image frame being defined by a scene graph and each object having an associated geometric bounding volume;
  if a dynamic change in an object is detected, render the object's geometric bounding volume to a stencil buffer for each dynamically changed object, using a stencil value assigned to the current image frame;
  apply a stencil test to determine areas in the frames having non-zero stencil values;
  clear a color buffer with respect to the areas in the previous image frame that have been redrawn and with respect to areas in the current frame that need to be overdrawn;
  render the image frame to a color buffer using a stencil test, so that only the areas with non-zero stencil values are redrawn; and
  remove the stencil values from a previous image frame from the stencil buffer.

In an embodiment, each object in a scene graph has an associated transformation matrix, with the processor detecting a dynamic change in an object by detecting whether an object's transformation matrix has changed.

In an embodiment, and in the case of single buffer rendering, the processor removes the stencil values from a previous image frame from the stencil buffer by removing the stencil values from the preceding image frame.

In this embodiment, every even image frame in the stencil buffer is assigned a stencil value of 1 and every odd image frame is assigned a stencil value of 2.

In particular, the processor removes the stencil values from the previous image frame from the stencil buffer by replacing every even image frame in the stencil buffer with a value of 2 with a 0, and replacing every odd image frame in the stencil buffer with a value of 1 with a 0.

In an alternate embodiment, and in the case of double buffer rendering, the processor removes the stencil values from a previous image frame from the stencil buffer by removing the stencil values for the frame rendered two frames before.

In this embodiment, the processor assigns a stencil value of 1 for the first frame, a stencil value of 2 for the second frame, a stencil value of 3 for the third frame, and then repeats this for subsequent frames.

In particular, two color buffers are provided, namely a front color buffer and a back color buffer, with the front color buffer being exposed to a user and the back color buffer being used to render the image in the background.

In an embodiment, the processor swaps the color buffers once the rendering in the back color buffer has been completed, so that the back color buffer then becomes the front color buffer and the front color buffer becomes the back color buffer to allow rendering of the next image frame to take place in the back color buffer.

In an embodiment, the objects are either opaque or translucent.

According to a third aspect of the invention there is provided an image rendering system comprising:

a central processing unit to run an application program stored in memory;
 a graphics processing unit having a host interface to receive raw graphics data and program instructions from the central processing unit; and
 a frame buffer memory comprising a depth buffer for storing depth information for each pixel in a frame, a color buffer for storing color information for each pixel, and a stencil buffer having a stencil register for each pixel, the frame buffer exchanging data with the graphics processing unit via a frame buffer interface,
 the central processing unit being arranged to:
  compare a current image frame with a previous image frame to detect a dynamic change in an object in the image frames, with each image frame being defined by a scene graph and each object having an associated geometric bounding volume;
  if a dynamic change in an object is detected, render the object's geometric bounding volume to the stencil buffer for each dynamically changed object, using a stencil value assigned to the current image frame;
  apply a stencil test to determine areas in the frames having non-zero stencil values;
  clear the color buffer with respect to the areas in the previous image frame that have been redrawn and with respect to areas in the current frame that need to be overdrawn;
  render the image frame to the color buffer using a stencil test, so that only the areas with non-zero stencil values are redrawn; and
  remove the stencil values from a previous image frame from the stencil buffer.

In an embodiment, each object in a scene graph has an associated transformation matrix, with the central processing unit detecting a dynamic change in an object by detecting whether an object's transformation matrix has changed.

In an embodiment, and in the case of single buffer rendering, the central processing unit removes the stencil values from a previous image frame from the stencil buffer by removing the stencil values from the preceding image frame.

In this embodiment, every even image frame in the stencil buffer is assigned a stencil value of 1 and every odd image frame is assigned a stencil value of 2.

In particular, the central processing unit removes the stencil values from the previous image frame from the stencil buffer by replacing every even image frame in the stencil buffer with a value of 2 with a 0, and replacing every odd image frame in the stencil buffer with a value of 1 with a 0.

In an alternate embodiment, and in the case of double buffering rendering, the central processing unit removes the stencil values from a previous image frame from the stencil buffer by removing the stencil values for the frame rendered two frames before.

In this embodiment, the central processing unit assigns a stencil value of 1 for the first frame, a stencil value of 2 for the second frame, a stencil value of 3 for the third frame, and then repeats this for subsequent frames.

In particular, two buffers are provided, namely a front color buffer and a back color buffer, with the front color buffer being exposed to a user and the back color buffer being used to render the image in the background.

In an embodiment, the processor swaps the color buffers once the rendering in the back color buffer has been completed, so that the back color buffer then becomes the front color buffer and the front color buffer becomes the back color buffer to allow rendering of the next image frame to take place in the back color buffer.

In an embodiment, the objects are either opaque or translucent.

According to a fourth aspect of the invention there is provided a non-transitory computer readable medium having stored thereon a set of computer readable instructions for causing a processor to render images comprising the computer implemented steps of:

comparing a current image frame with a previous image frame to detect a dynamic change in an object in the image frames, with each image frame being defined by a scene graph and each object having an associated geometric bounding volume;
 if a dynamic change in an object is detected, rendering the object's geometric bounding volume to a stencil buffer for each dynamically changed object, using a stencil value assigned to the current image frame;
 applying a stencil test to determine areas in the frames having non-zero stencil values;
 clearing a color buffer with respect to the areas in the previous image frame that have been redrawn and with respect to areas in the current frame that need to be overdrawn;
 rendering the image frame to a color buffer using a stencil test, so that only the areas with non-zero stencil values are redrawn; and
 removing the stencil values from a previous image frame from the stencil buffer.

In an embodiment, each object in a scene graph has an associated transformation matrix, with the computer implemented step of detecting a dynamic change in an object comprising detecting whether an object's transformation matrix has changed.

In an embodiment, and in the case of single buffering, the computer implemented step of removing the stencil values from a previous image frame from the stencil buffer comprises removing the stencil values from the preceding image frame.

In this embodiment, every even image frame in the stencil buffer is assigned a stencil value of 1 and every odd image frame is assigned a stencil value of 2.

In particular, the computer implemented step of removing the stencil values from the previous image frame from the stencil buffer comprises replacing every even image frame in the stencil buffer with a value of 2 with a 0, and replacing every odd image frame in the stencil buffer with a value of 1 with a 0.

In an alternate embodiment, and in the case of double buffer rendering, the computer implemented step of removing the stencil values from a previous image frame from the stencil buffer comprises the computer implemented step of removing the stencil values for the frame rendered two frames before.

In this embodiment, the computer implemented steps further comprises assigning a stencil value of 1 for the first frame, a stencil value of 2 for the second frame, a stencil value of 3 for the third frame, and then repeating this for subsequent frames.

In particular, the computer implemented steps further comprises providing two color buffers, namely a front color buffer and a back color buffer, with the front color buffer being exposed to a user and the back color buffer being used to render the image in the background.

In an embodiment, the computer implemented steps further comprises swapping the color buffers once the rendering in the back color buffer has been completed, so that the back color buffer then becomes the front color buffer and the front color buffer becomes the back color buffer to allow rendering of the next image frame to take place in the back color buffer.

BRIEF DESCRIPTION OF THE DRAWINGS

The invention will be described, by way of example only, with reference to the accompanying drawings in which.

DETAILED DESCRIPTION OF THE DRAWINGS

Figure 1:
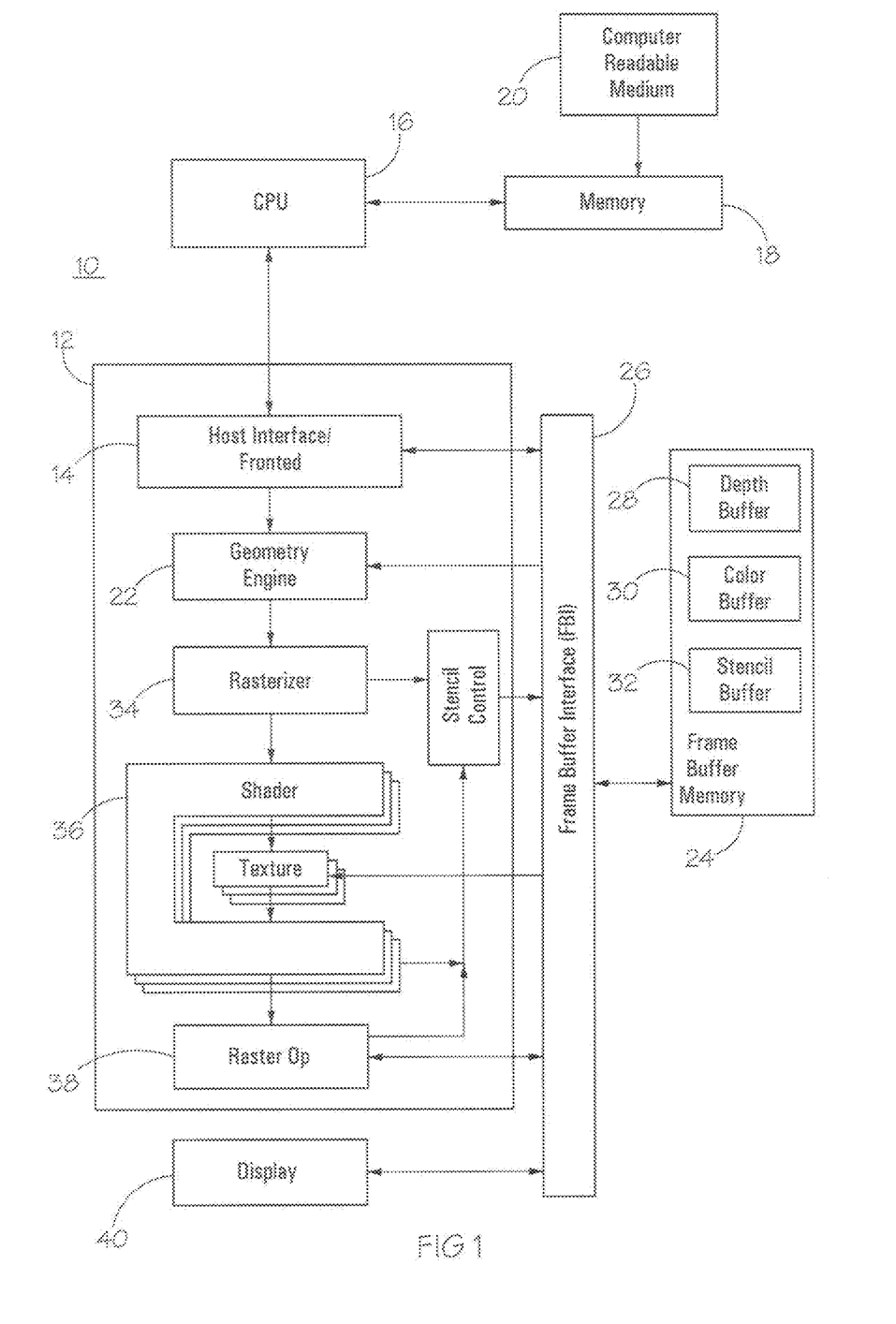
FIG. 1 shows a computer system that incorporates the principles according to aspects of the present invention.

Referring first to FIG. 1, a simplified block diagram of a computer system 10 is shown for implementing the principles of the present invention. The computer system 10 includes a graphics processing unit 12 integrated circuit having a host interface/front end 14. The host interface/front end 14 receives raw graphics data and program instructions from a central processing unit 16 that is running an application program that is stored in a memory 18. The application program, which can be input from a computer readable medium 20 causes the computer system 10 to implement the principles of the present invention.

The host interface/front end 14 buffers input information and supplies raw graphic information to a geometry engine 22. The geometry engine 22 has access to a frame buffer memory 24 via a frame buffer interface 26. The geometry engine 22 produces, scales, rotates, and projects three-dimensional vertices of graphics primitives in "model" coordinates that are stored in the frame buffer memory 24 into two-dimensional frame-buffer coordinates.

The frame buffer memory 24 includes a depth buffer 28 for storing depth information for each pixel, a color buffer 30 for storing color information for each pixel, and a stencil buffer memory 32 having a stencil register for each pixel. Uses of the stencil buffer memory 32 have been previously described. However, for purposes of illustration, it will be assumed that the application program in memory 18 implements a partial rendering routine wherein only changed images or fragment are rendered.

The two-dimensional frame-buffer coordinates of the vertices of the graphics primitives from the geometry engine 22 are passed to a rasterizer 34. The rasterizer 34 identifies the positions of all of the pixels within the graphics primitives. This is typically performed along raster (horizontal) lines that extend between the lines that define the graphics primitives. The output of the rasterizer 34 is referred to as rasterized pixel data. The rasterized pixel data are applied to a shader 36 that processes input data (code, position, texture, conditions, constants, etc) using a shader program (sequence of instructions) to generate output data.

The shader 36 includes a texture engine 38 that modifies the rasterized pixel data to have the desired texture and visual features. The texture engine 38, which has access to the data stored in the frame buffer memory 24, can be implemented using a hardware pipeline that processes large amounts of data at very high speed. The shaded pixel data is then sent to a Raster Operations Processor 38 that optionally performs additional processing on the shaded pixel data including stencil processing. The end result is pixel data that is stored in the frame buffer memory 24 by the frame buffer interface 26. The frame pixel data can be used for various processes such as displaying an image on a display 40.

In use, upon start-up, the colour buffer and stencil buffers are cleared. Thereafter, and with reference now to FIG. 2, an image rendering method 100 is shown comprising the step of comparing a current image frame with a previous image frame to detect a dynamic change in an object in the image frames, as indicated by block 102.

Figure 2:
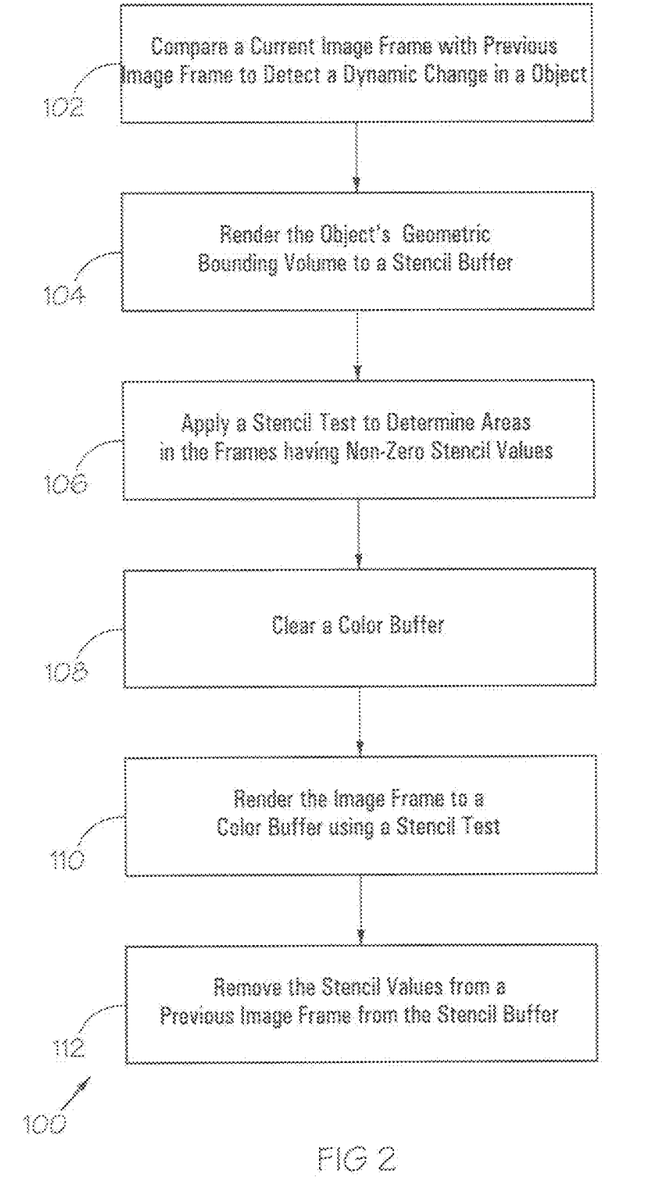
FIG. 2 shows a high level schematic flow chart representing an image rendering method according to one embodiment of the present invention.

As is well known, each image frame is defined by a scene graph and each object has an associated geometric bounding volume. In an embodiment, each object in a scene graph has an associated transformation matrix, with the step 102 of detecting a change in an image in the image frames comprising detecting whether an object's transformation matrix has changed. Alternatively, or as part of this process, this may, in more general terms, involves determining if the value of any property affecting the visual appearance (or position or orientation in space) of the object has changed since the previous frame. If so, the object should be considered as having changed.

If a dynamic change in an object is detected, the object's geometric bounding volume is rendered to a stencil buffer for each dynamically changed object, as indicated by block 104. This is typically done by using a stencil value assigned to the current image frame.

Thereafter, and as indicated by block 106, a stencil test is applied to determine areas in the frames having non-zero stencil values.

The color buffer with respect to the areas in the previous image frame that have been redrawn and with respect to areas in the current frame that need to be overdrawn, is then cleared, as indicated by block 108. This is done by applying the stencil test so that only areas with stencil values that are different from zero will be cleared.

Thereafter, the method 100 comprises rendering the image frame to a color buffer using a stencil test, as indicated by block 110. As a result, only the areas with non-zero stencil values are redrawn. The GPU will accordingly discard further processing of fragments or objects that fail the stencil test.

The method 100 concludes, at a high level, by removing the stencil values from a previous image frame from the stencil buffer, as indicated by block 112. As will be explained in more detail further below, in the case of single buffer rendering (in which there is only a single color buffer), this means removing the stencil values from the previous image frame; in the case of double buffering (or N-buffering in the general case, the stencil values are removed from the second preceding frame (or from the Nth preceding frame in the general case).

As indicated in the preceding paragraph, in the case of single buffering, the step of removing the stencil values from a previous image frame from the stencil buffer comprises removing the stencil values from the preceding image frame. In this embodiment, every even image frame in the stencil buffer is assigned a stencil value of 1 and every odd image frame is assigned a stencil value of 2. In particular, the step of removing the stencil values from the previous image frame from the stencil buffer comprises replacing every even image frame in the stencil buffer with a value of 2 with a 0, and replacing every odd image frame in the stencil buffer with a value of 1 with a 0. By varying the stencil value for every odd and even frames, it is possible to clear the results from old frames while rendering only dynamically changed areas.

The alternative embodiment of double buffering will be best described with reference to FIGS. 3A to 3D. A double buffer is shown in these figures, comprising two color buffers, but the methodology applied here may easily be extended to N-buffering (i.e. N color buffers).

Figure 3A:
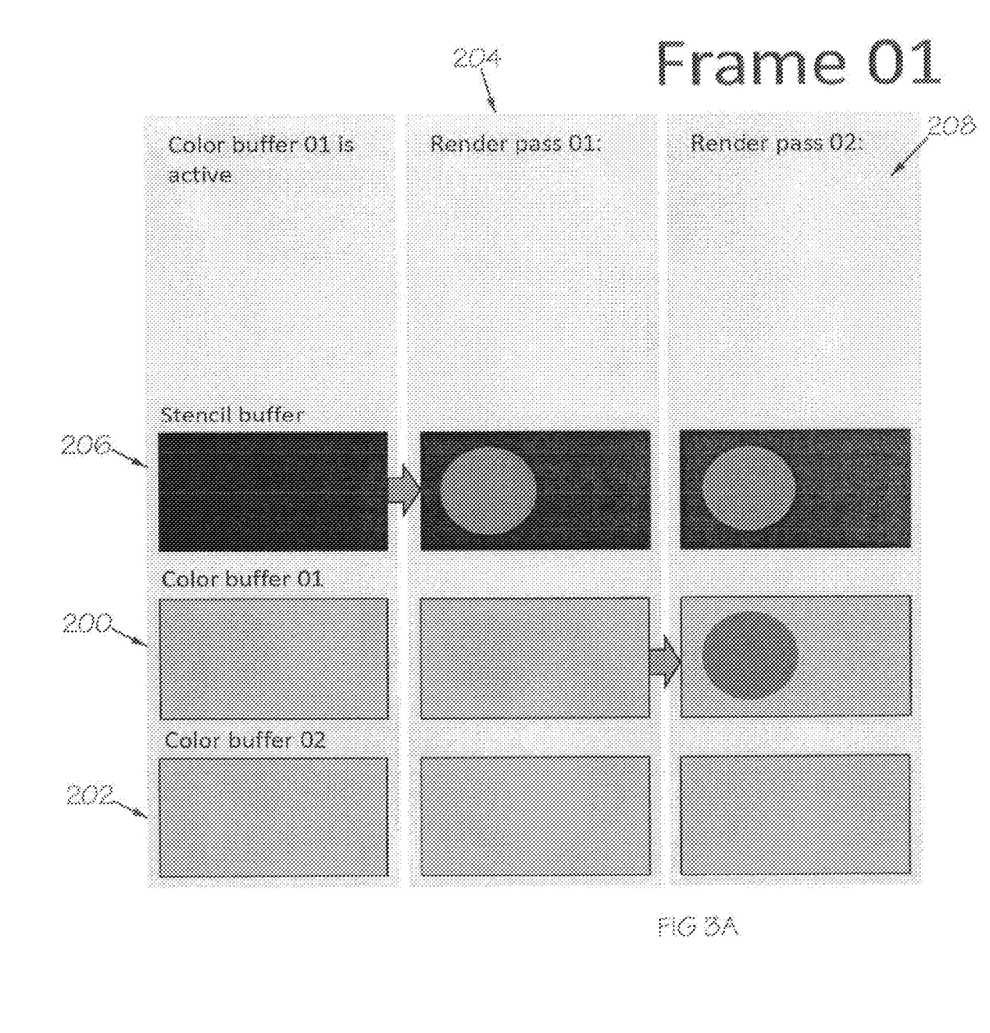
FIGS. 3A to 3D show four consecutive image frames that illustrate an example of the image rendering method of an embodiment of the present invention in use, but in particular showing partial rendering using two buffers.
Figure 3B:
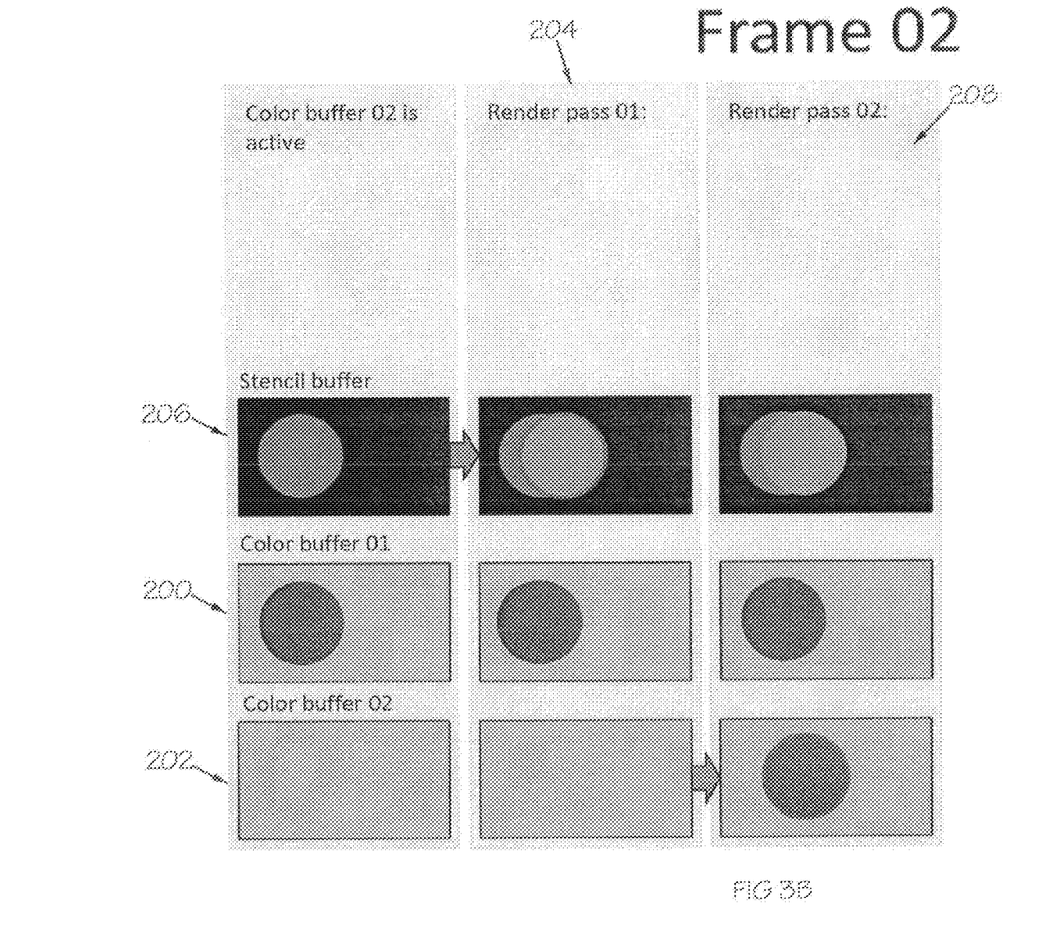
Figure 3C:
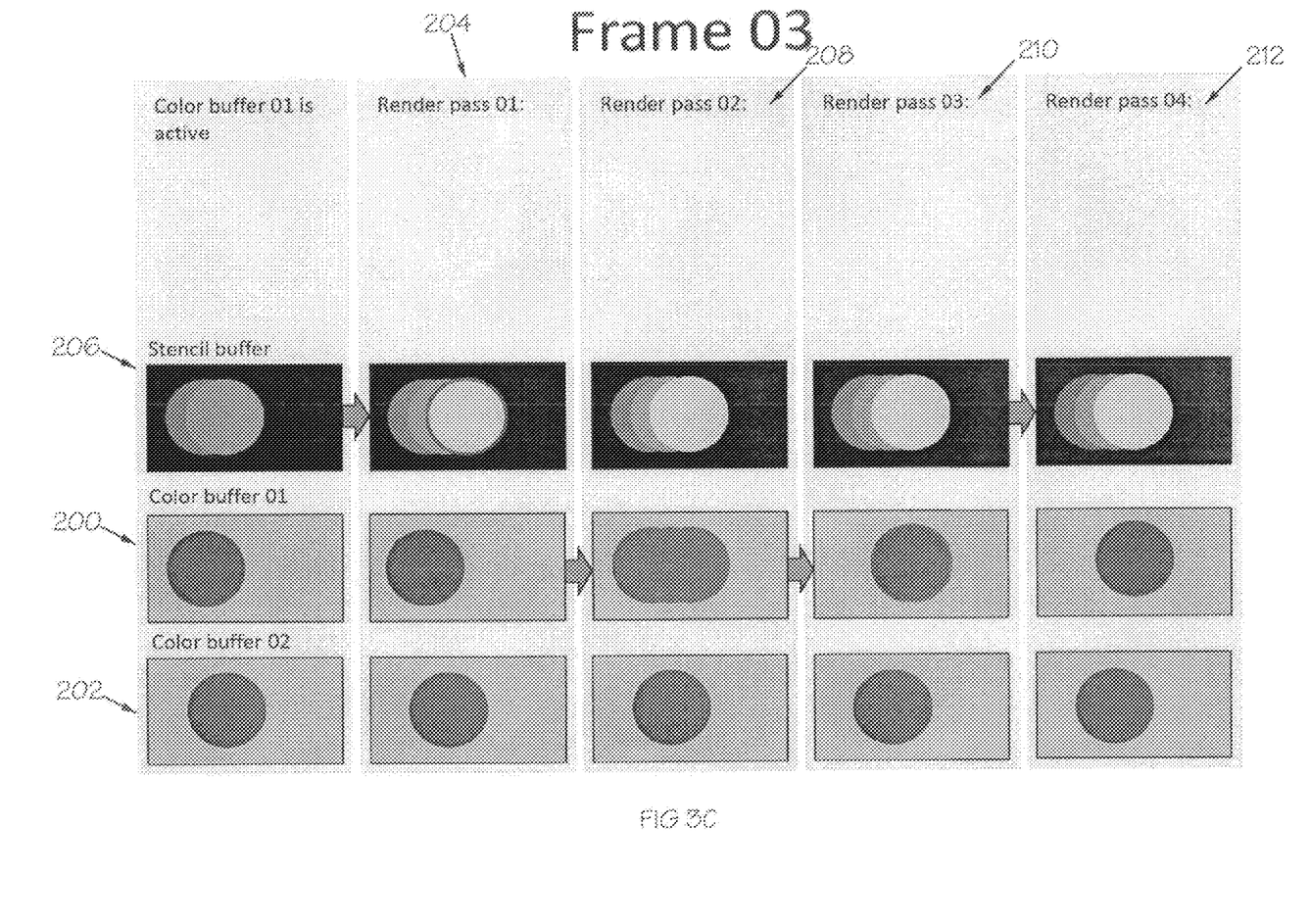
Figure 3D:
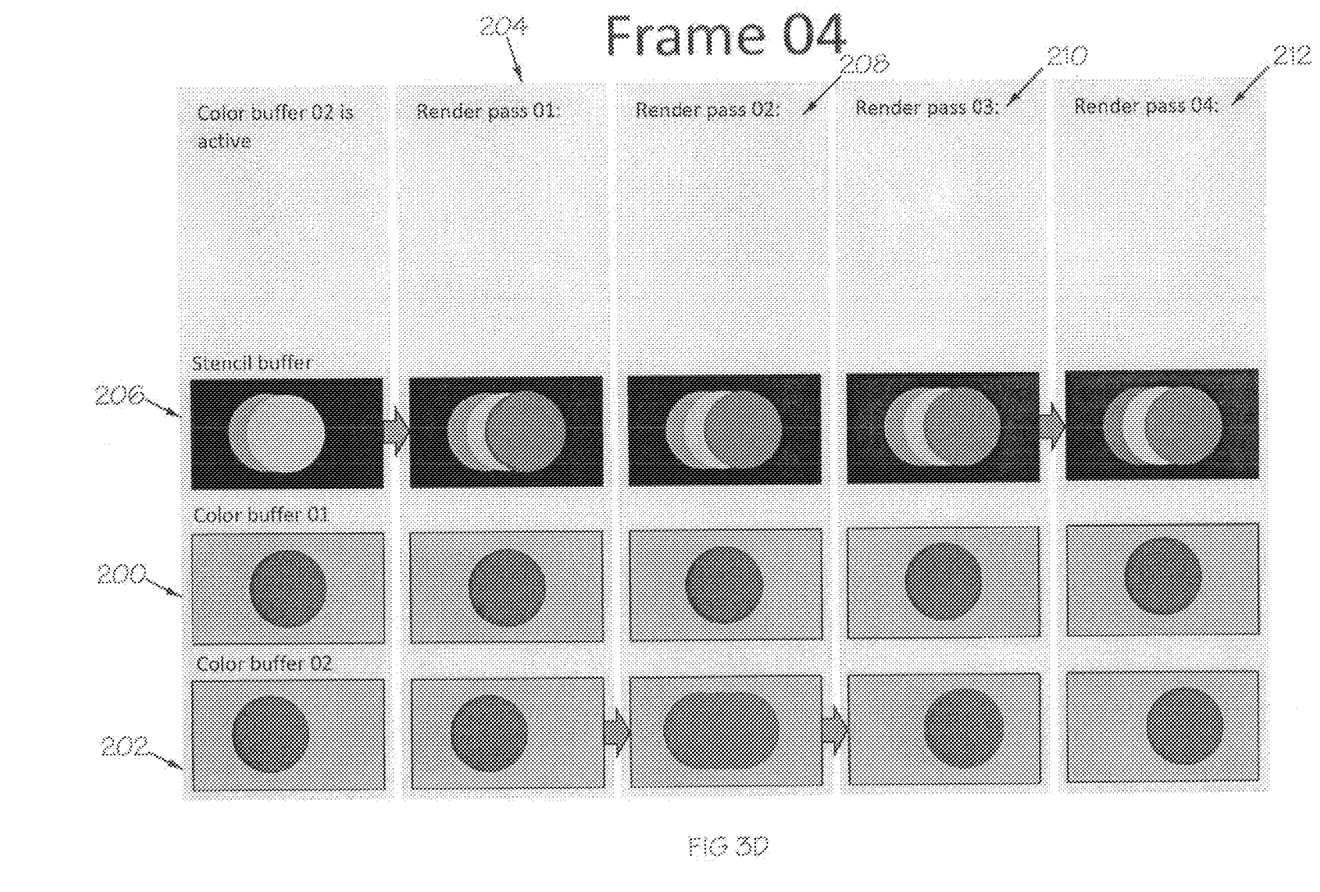

FIGS. 3A to 3D show four consecutive, sequential frames, namely Frame 01 in FIG. 3A, Frame 02 in FIG. 3B, Frame 03 in FIG. 3C and Frame 04 in FIG. 3D. In particular, two color buffers 200, 202 are provided, namely a front color buffer and a back color buffer. The front color buffer is exposed to a user and the back color buffer is used to render the image in the background. In addition, the solution of the present invention comprises swapping the color buffers 200, 202 once the rendering in the back color buffer has been completed, so that the back color buffer then becomes the front color buffer and the front color buffer becomes the back color buffer to allow rendering of the next image frame to take place in the back color buffer. Thus, in Frame 01 (FIG. 3A), 'color buffer 01' 200 is active, in Frame 02 (FIG. 3B), 'color buffer 02' 202 is active, in Frame 03 (FIG. 3C), 'color buffer 01' 200 is active, and in Frame 4 (FIG. 3B), 'color buffer 02' 202 is active.

In this embodiment, the method comprises assigning a stencil value of 1 for the first frame, a stencil value of 2 for the second frame, a stencil value of 3 for the third frame, with this then being repeated.

Thus, in 'render pass 01' 204, the object's geometric bounding volume is rendered to a stencil buffer 206 (as described above with reference to method step 104 in FIG. 2). Thereafter, in 'render pass 02' 208, the geometry of the current image frame is rendered to the (active) 'color buffer 01' 200.

In Frame 02 (FIG. 3B), in 'render pass 01' 204, the object's geometric bounding volume is rendered to the stencil buffer 206. Thereafter, in 'render pass 02' 208, the geometry of the current image frame is rendered to the (active) 'color buffer 02' 202.

In Frame 03 (FIG. 3C), in 'render pass 01' 204, the object's geometric bounding volume is rendered to the stencil buffer 206. Thereafter, in 'render pass 02' 208, the color buffer in respect of the rendered geometric bounding volume from the two previous frames are cleared (i.e. the active 'color buffer 01'). This may be done by rendering a black full screen quad using a stencil test in which the geometry is rendered if the value in the stencil buffer is non-zero. Thereafter, in 'render pass 03' 210, the current frame's geometry is rendered into the active 'color buffer 01' 200 using a stencil test i.e. the geometry is rendered if the value in the stencil buffer=3 (in this case). Finally, in 'render pass 04' 212, the stencil values for the frame rendered two frames before are removed, which may be done by rendering a full screen quad using a stencil test.

Finally, Frame 04 (FIG. 3D) is substantially similar to Frame 03 (FIG. 3C), except that the stencil reference value has reverted back to '1', as described above, and the active color buffer is now 'color buffer 2'.

To summarize double-buffering, the algorithm for double-buffered (N-buffered) partial rendering is as follows:
  render stencil mask (i.e. the geometric bounding volume, as described above) for currently changed objects to the stencil buffer using stencil value for this image frame;
  clear the fragments in the color buffer for which the stencil values in stencil buffer are different from 0;
  render image frame to color buffer into the areas where stencil value from fragments is different from 0;
  erase stencil masks which was drawn 2 frames before the current mage frame (in the general case, N frames before the current image frame if N-buffered rendering).

To further explain the algorithm, consider the following scenario: at the current frame the image frame has been drawn into one specific color buffer of N color buffers (considering N-buffered rendering). After that, the color buffers are swapped. After N frames the scene will be rendered to the same specific buffer, for which stencil masks should be preserved, and since 1 stencil value was used before for this specific buffer and N−1 stencil values for other N−1 buffers, partial rendering should utilize (N+1)th stencil value to render stencil masks for the current frame. This way for the current buffer the partial rendering has both stencil masks for moving objects from N frames before and for the current frame, so it could effectively clear previous images of moving objects in this specific buffer and render their new images for the current frame.

The proposed solution of the present invention will overall increase the performance on fill-rate bound graphics hardware, especially if the dynamic area is relatively small compared to the size of the graphics context. In addition, the proposed solution reduces the GPU fragment processing for complete a scene graph by rendering scene graph geometries' bounding volumes to a stencil buffer for each dynamically changed object.

Embodiments of the present invention can be described with respect to the following example clauses:

Clause 1, An image rendering method comprising: comparing a current image frame with a previous image frame to detect a dynamic change in an object in the image frames, with each image frame being defined by a scene graph and each object having an associated geometric bounding volume; if a dynamic change in an object is detected, rendering the object's geometric bounding volume to a stencil buffer for each dynamically changed object, using a stencil value assigned to the current image frame; applying a stencil test to determine areas in the frames having non-zero stencil values; clearing a color buffer with respect to the areas in the previous image frame that have been redrawn and with respect to areas in the current frame that need to be overdrawn; rendering the image frame to the color buffer using a stencil test, so that only the areas with non-zero stencil values are redrawn; and removing the stencil values from a previous image frame from the stencil buffer.

Clause 2, The image rendering method of clause 1, wherein each object in a scene graph has an associated transformation matrix, with the step of detecting a dynamic change in an object comprising detecting whether an object's transformation matrix has changed.

Clause 3, The image rendering method of clause 1 or 2, wherein in the case of single buffer rendering, the step of removing the stencil values from a previous image frame from the stencil buffer comprises removing the stencil values from the preceding image frame.

Clause 4, The image rendering method of clause 3, wherein every even image frame in the stencil buffer is assigned a stencil value of 1 and every odd image frame is assigned a stencil value of 2.

Clause 5, The image rendering method of clause 4, wherein the step of removing the stencil values from the previous image frame from the stencil buffer comprises replacing every even image frame in the stencil buffer with a value of 2 with a 0, and replacing every odd image frame in the stencil buffer with a value of 1 with a 0.

Clause 6, The image rendering method of any of the previous clauses, wherein in the case of double buffer rendering, the step of removing the stencil values from a previous image frame from the stencil buffer comprises the step of removing the stencil values for the frame rendered two frames before.

Clause 7, The image rendering method of clause 6, wherein the method comprises assigning a stencil value of 1 for the first frame, a stencil value of 2 for the second frame, a stencil value of 3 for the third frame, and then repeating this for subsequent frames.

Clause 8, The image rendering method of clause 7, wherein the method comprises providing two color buffers, namely a front color buffer and a back color buffer, with the front color buffer being exposed to a user and the back color buffer being used to render the image in the background.

Clause 9, The image rendering method of clause 8, wherein the method comprises swapping the color buffers once the rendering in the back color buffer has been completed, so that the back color buffer then becomes the front color buffer and the front color buffer becomes the back color buffer to allow rendering of the next image frame to take place in the back color buffer.

Clause 10, The image rendering method of any of the previous clauses, wherein the objects are either opaque or translucent.

Clause 11, An image rendering system comprising a processor to: compare a current image frame with a previous image frame to detect a dynamic change in an object in the image frames, with each image frame being defined by a scene graph and each object having an associated geometric bounding volume; if a dynamic change in an object is detected, render the object's geometric bounding volume to a stencil buffer for each dynamically changed object, using a stencil value assigned to the current image frame; apply a stencil test to determine areas in the frames having non-zero stencil values; clear a color buffer with respect to the areas in the previous image frame that have been redrawn and with respect to areas in the current frame that need to be overdrawn; render the image frame to a color buffer using a stencil test, so that only the areas with non-zero stencil values are redrawn; and remove the stencil values from a previous image frame from the stencil buffer.

Clause 12, The image rendering system of clause 11, wherein each object in a scene graph has an associated transformation matrix, with the processor detecting a dynamic change in an object by detecting whether an object's transformation matrix has changed.

Clause 13, The image rendering system of clause 11 or 12, wherein in the case of single buffer rendering, the processor removes the stencil values from a previous image frame from the stencil buffer by removing the stencil values from the preceding image frame.

Clause 14, The image rendering system of clause 13, wherein every even image frame in the stencil buffer is assigned a stencil value of 1 and every odd image frame is assigned a stencil value of 2.

Clause 15, The image rendering system of clause 14, wherein the processor removes the stencil values from the previous image frame from the stencil buffer by replacing every even image frame in the stencil buffer with a value of 2 with a 0, and replacing every odd image frame in the stencil buffer with a value of 1 with a 0.

Clause 16, The image rendering system of any of clauses 11-15, wherein in the case of double buffer rendering, the processor removes the stencil values from a previous image frame from the stencil buffer by removing the stencil values for the frame rendered two frames before.

Clause 17. The image rendering system of clause 16, wherein the processor assigns a stencil value of 1 for the first frame, a stencil value of 2 for the second frame, a stencil value of 3 for the third frame, and then repeats this for subsequent frames.

Clause 18. The image rendering system of clause 17, wherein two color buffers are provided, namely a front color buffer and a back color buffer, with the front color buffer being exposed to a user and the back color buffer being used to render the image in the background.

Clause 19. The image rendering system of clause 18, wherein the processor swaps the color buffers once the rendering in the back color buffer has been completed, so that the back color buffer then becomes the front color buffer and the front color buffer becomes the back color buffer to allow rendering of the next image frame to take place in the back color buffer.

Clause 20. An image rendering system comprising: a central processing unit to run an application program stored in memory; a graphics processing unit having a host interface to receive raw graphics data and program instructions from the central processing unit; and a frame buffer memory comprising a depth buffer for storing depth information for each pixel in a frame, a color buffer for storing color information for each pixel, and a stencil buffer having a stencil register for each pixel, the frame buffer exchanging data with the graphics processing unit via a frame buffer interface, the central processing unit being arranged to: compare a current image frame with a previous image frame to detect a dynamic change in an object in the image frames, with each image frame being defined by a scene graph and each object having an associated geometric bounding volume; if a dynamic change in an object is detected, render the object's geometric bounding volume to the stencil buffer for each dynamically changed object, using a stencil value assigned to the current image frame; apply a stencil test to determine areas in the frames having non-zero stencil values; clear the color buffer with respect to the areas in the previous image frame that have been redrawn and with respect to areas in the current frame that need to be overdrawn; render the image frame to the color buffer using a stencil test, so that only the areas with non-zero stencil values are redrawn; and remove the stencil values from a previous image frame from the stencil buffer.

Clause 21. The image rendering system of clause 20, wherein each object in a scene graph has an associated transformation matrix, with the central processing unit detecting a dynamic change in an object by detecting whether an object's transformation matrix has changed.

Clause 22. The image rendering system of clause 20 or 21, wherein in the case of single buffer rendering, the central processing unit removes the stencil values from a previous image frame from the stencil buffer by removing the stencil values from the preceding image frame.

Clause 23. The image rendering system of clause 22, wherein every even image frame in the stencil buffer is assigned a stencil value of 1 and every odd image frame is assigned a stencil value of 2.

Clause 24. The image rendering system of clause 23, wherein the central processing unit removes the stencil values from the previous image frame from the stencil buffer by replacing every even image frame in the stencil buffer with a value of 2 with a 0, and replacing every odd image frame in the stencil buffer with a value of 1 with a 0.

Clause 25. The image rendering system of any of clauses 20-24, wherein in the case of double buffer rendering, the central processing unit removes the stencil values from a previous image frame from the stencil buffer by removing the stencil values for the frame rendered two frames before.

Clause 26. The image rendering system of clause 25, wherein the central processing unit assigns a stencil value of 1 for the first frame, a stencil value of 2 for the second frame, a stencil value of 3 for the third frame, and then repeats this for subsequent frames.

Clause 27. The image rendering system of clause 26, wherein two buffers are provided, namely a front color buffer and a back color buffer, with the front color buffer being exposed to a user and the back color buffer being used to render the image in the background.

Clause 28. The image rendering system of clause 27, wherein the central processing unit swaps the color buffers once the rendering in the back color buffer has been completed, so that the back color buffer then becomes the front color buffer and the front color buffer becomes the back color buffer to allow rendering of the next image frame to take place in the back color buffer.

Clause 29. A non-transitory computer readable medium having stored thereon a set of computer readable instructions for causing a processor to render images comprising the computer implemented steps of: comparing a current image frame with a previous image frame to detect a dynamic change in an object in the image frames, with each image frame being defined by a scene graph and each object having an associated geometric bounding volume; if a dynamic change in an object is detected, rendering the object's geometric bounding volume to a stencil buffer for each dynamically changed object, using a stencil value assigned to the current image frame; applying a stencil test to determine areas in the frames having non-zero stencil values; clearing a color buffer with respect to the areas in the previous image frame that have been redrawn and with respect to areas in the current frame that need to be overdrawn; rendering the image frame to a color buffer using a stencil test, so that only the areas with non-zero stencil values are redrawn; and removing the stencil values from a previous image frame from the stencil buffer.

Clause 30. The non-transitory computer readable medium of clause 29, wherein each object in a scene graph has an associated transformation matrix, with the computer implemented step of detecting a dynamic change in an object comprising detecting whether an object's transformation matrix has changed.

Clause 31. The non-transitory computer readable medium of clause 29 or 30, wherein in the case of single buffer rendering, the computer implemented step of removing the stencil values from a previous image frame from the stencil buffer comprises removing the stencil values from the preceding image frame.

Clause 32. The non-transitory computer readable medium of clause 31, wherein every even image frame in the stencil buffer is assigned a stencil value of 1 and every odd image frame is assigned a stencil value of 2.

Clause 33. The non-transitory computer readable medium of clause 32, wherein the computer implemented step of removing the stencil values from the previous image frame from the stencil buffer comprises replacing every even image frame in the stencil buffer with a value of 2 with a 0, and replacing every odd image frame in the stencil buffer with a value of 1 with a 0.

Clause 34. The non-transitory computer readable medium of any of clauses 29-33, wherein in the case of double buffer rendering, the computer implemented step of removing the stencil values from a previous image frame from the stencil buffer comprises the computer implemented step of removing the stencil values for the frame rendered two frames before.

Clause 35. The non-transitory computer readable medium of clause 34, which comprises assigning a stencil value of 1 for the first frame, a stencil value of 2 for the second frame, a stencil value of 3 for the third frame, and then repeating this for subsequent frames.

Clause 36. The non-transitory computer readable medium of clause 35, which comprises providing two color buffers, namely a front color buffer and a back color buffer, with the front color buffer being exposed to a user and the back color buffer being used to render the image in the background.

Clause 37. The non-transitory computer readable medium of clause 36, which comprises swapping the color buffers once the rendering in the back color buffer has been completed, so that the back color buffer then becomes the front color buffer and the front color buffer becomes the back color buffer to allow rendering of the next image frame to take place in the back color buffer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An image rendering method comprising:
comparing a current image frame with a previous image frame to detect a dynamic change in at least one object in the image frames, with each image frame being defined by a scene graph and each object having an associated geometric bounding volume;
responsive to dynamic change being detected in each of the at least one object, rendering each of the at least one object's geometric bounding volume to a stencil buffer, using a stencil value assigned to the current image frame, the stencil buffer having a stencil register for each pixel;
applying a stencil test to determine areas in the current image frame and the previous image frame having non-zero stencil values;
rendering the current image frame to a color buffer using the stencil test, so that only the areas with non-zero stencil values are redrawn; and
removing stencil values from the previous image frame and a frame preceeding the previous image frame from the stencil buffer.

2. The image rendering method of claim 1, wherein each object in a scene graph has an associated transformation matrix, with the step of detecting a dynamic change in the at least one object comprising detecting whether the at least one object's transformation matrix has changed.

3. The image rendering method of claim 1, wherein in the case of single buffer rendering, the step of removing the stencil values from the stencil buffer comprises removing the stencil values from the preceding image frame.

4. The image rendering method of claim 3, wherein every even image frame is assigned a stencil value of 1 and every odd image frame is assigned a stencil value of 2.

5. The image rendering method of claim 4, wherein the step of removing the stencil values from the stencil buffer comprises replacing the stencil values assigned to every even image frame in the stencil buffer with a value of 2 with a 0, and replacing the stencil values assigned to every odd image frame in the stencil buffer with a value of 1 with a 0.

6. The image rendering method of claim 1, wherein in the case of double buffer rendering, the step of removing the stencil values from the stencil buffer comprises removing the stencil values for a frame rendered two frames before.

7. The image rendering method of claim 6, wherein the method comprises assigning a stencil value of 1 for a first frame, a stencil value of 2 for a second frame, a stencil value of 3 for a third frame, and then repeating this for subsequent frames.

8. The image rendering method of claim 7, wherein the method comprises providing two color buffers, namely a front color buffer and a back color buffer, with the front color buffer being exposed to a user and the back color buffer being used to render the image in the background.

9. The image rendering method of claim 8, wherein the method comprises swapping the two color buffers once the rendering in the back color buffer has been completed, so that the back color buffer then becomes the front color buffer and the front color buffer becomes the back color buffer to allow rendering of the next image frame to take place in the back color buffer.

10. The image rendering method of claim 8, further comprising clearing a color buffer with respect to areas in the previous image frame that have been redrawn and with respect to areas in the current image frame that need to be overdrawn.

11. An image rendering system comprising:
a central processing unit to run an application program stored in memory;
a graphics processing unit having a host interface to receive raw graphics data and program instructions from the central processing unit; and
a frame buffer memory comprising a depth buffer for storing depth information for each pixel in a frame, a color buffer for storing color information for each pixel, and a stencil buffer having a stencil register for each pixel, the frame buffer exchanging data with the graphics processing unit via a frame buffer interface,
the central processing unit being arranged to:
compare a current image frame with a previous image frame to detect a dynamic change in at least on object in the image frames, with each image frame being defined by a scene graph and each object having an associated geometric bounding volume;
if a dynamic change in the at least one object is detected, render each of the at least one object's geometric bounding volume to the stencil buffer, using a stencil value assigned to the current image frame;
apply a stencil test to determine areas in the current image frame and the previous image frame having non-zero stencil values;
render the current image frame to a color buffer using the stencil test, so that only the areas with non-zero stencil values are redrawn; and
remove stencil values from the previous image frame and a frame preceding the previous image frame from the stencil buffer.

12. The image rendering system of claim 11, wherein each object in a scene graph has an associated transformation matrix, with the central processing unit detecting a dynamic change in the at least one object by detecting whether the at least one object's transformation matrix has changed.

13. The image rendering system of claim 11, wherein in the case of single buffer rendering, the central processing unit removes the stencil values from the stencil buffer by removing the stencil values from the preceding image frame.

14. The image rendering system of claim 13, wherein every even image frame is assigned a stencil value of 1 and every odd image frame is assigned a stencil value of 2.

15. The image rendering system of claim 14, wherein the central processing unit removes the stencil values from the stencil buffer by replacing the stencil values assigned to every even image frame in the stencil buffer with a value of 2 with a 0, and replacing the stencil values assigned to every odd image frame in the stencil buffer with a value of 1 with a 0.

16. The image rendering system of claim 11, wherein in the case of double buffer rendering, the central processing unit removes the stencil values from the stencil buffer by removing the stencil values for a frame rendered two frames before.

17. The image rendering system of claim 16, wherein the central processing unit assigns a stencil value of 1 for a first frame, a stencil value of 2 for a second frame, a stencil value of 3 for a third frame, and then repeats this for subsequent frames.

18. The image rendering system of claim 17, wherein two color buffers are provided, namely a front color buffer and a back color buffer, with the front color buffer being exposed to a user and the back color buffer being used to render the image in the background.

19. The image rendering system of claim 18, wherein the central processing unit is arranged to swap the two color buffers once the rendering in the back color buffer has been completed, so that the back color buffer then becomes the front color buffer and the front color buffer becomes the back color buffer to allow rendering of the next image frame to take place in the back color buffer.

20. A non-transitory computer readable medium having stored thereon a set of computer readable instructions for causing a processor to render images comprising the computer implemented steps of:
- comparing a current image frame with a previous image frame to detect a dynamic change in at least one object in the image frames, with each image frame being defined by a scene graph and each object having an associated geometric bounding volume;
- if a dynamic change in the at least one object is detected, rendering each of the at least one object's geometric bounding volume to a stencil buffer, using a stencil value assigned to the current image frame, the stencil buffer having a stencil register for each pixel;
- applying a stencil test to determine areas in the current image frame and the previous image frame having non-zero stencil values;
- rendering the current image frame to a color buffer using the stencil test, so that only the areas with non-zero stencil values are redrawn; and
- removing stencil values from the previous image frame and a frame preceding the previous image frame from the stencil buffer.

* * * * *